United States Patent
Nasr

(10) Patent No.: US 6,592,757 B2
(45) Date of Patent: Jul. 15, 2003

(54) SELECTOR CONTACT STABILIZATION PROCESS AND APPARATUS FOR WASTEWATER TREATMENT

(75) Inventor: Sami M. Nasr, Davidsonville, MD (US)

(73) Assignee: O'Brien & Gere Engineers, Inc., Syracuse, NY (US)

(*) Notice: Subject to any disclaimer, the term of this patent is extended or adjusted under 35 U.S.C. 154(b) by 0 days.

(21) Appl. No.: 09/774,222

(22) Filed: Jan. 30, 2001

(65) Prior Publication Data

US 2001/0045382 A1 Nov. 29, 2001

Related U.S. Application Data

(60) Provisional application No. 60/178,917, filed on Feb. 1, 2000.

(51) Int. Cl.[7] .................................................. C02F 3/30
(52) U.S. Cl. .................... 210/195.1; 210/202; 210/205; 210/605; 210/623; 210/903; 210/906
(58) Field of Search ................................. 210/605, 621, 210/623, 626, 628, 630, 195.1, 195.3, 198.1, 201, 202, 205, 259, 903, 906

(56) References Cited

U.S. PATENT DOCUMENTS

| | | | |
|---|---|---|---|
| 2,901,114 A | 8/1959 | Smith et al. | |
| 3,152,982 A | 10/1964 | Pagnotti | |
| 3,186,939 A | 6/1965 | Murray | |
| 3,849,303 A | 11/1974 | Torpey | |
| 3,900,394 A * | 8/1975 | Rongved | 210/629 |
| 4,056,465 A * | 11/1977 | Spector | 210/605 |
| 4,192,740 A | 3/1980 | Savard et al. | |
| 4,271,026 A * | 6/1981 | Chen et al. | 210/605 |
| 4,284,510 A | 8/1981 | Savard et al. | |
| 4,301,007 A | 11/1981 | Savard et al. | |
| 4,315,821 A * | 2/1982 | Climenhage | 210/605 |
| 4,351,722 A | 9/1982 | Mixon | |
| 4,431,543 A * | 2/1984 | Matsuo et al. | 210/605 |
| RE32,429 E * | 6/1987 | Spector | 210/605 |
| 4,793,930 A | 12/1988 | Soeder et al. | |
| 4,859,325 A | 8/1989 | Cormier | |
| 4,948,510 A * | 8/1990 | Todd et al. | 210/605 |
| 4,952,316 A | 8/1990 | Cooley | |
| 4,966,705 A | 10/1990 | Jamieson et al. | |
| 4,999,111 A | 3/1991 | Williamson | |
| 5,182,021 A * | 1/1993 | Spector | 210/605 |
| 5,354,471 A * | 10/1994 | Timpany et al. | 210/607 |
| 5,364,529 A | 11/1994 | Morin et al. | |
| 5,463,176 A | 10/1995 | Eckert | |
| 5,472,611 A | 12/1995 | von Nordenskjold et al. | |
| 5,480,548 A * | 1/1996 | Daigger et al. | 210/605 |
| 5,611,927 A * | 3/1997 | Schmid | 210/605 |
| 5,626,755 A | 5/1997 | Keyser et al. | |
| 5,747,311 A * | 5/1998 | Jewell | 435/176 |
| 6,139,743 A * | 10/2000 | Park et al. | 210/605 |

* cited by examiner

Primary Examiner—Fred Prince
(74) Attorney, Agent, or Firm—George R. McGuire; Hancock & Estabrook, LLP

(57) ABSTRACT

The apparatus of the present invention generally comprises a wastewater contact tank that is broken into three distinct zones: a selector zone positioned between a stabilization zone and a contact zone. The entire influent is introduced into the selector zone which is maintained in an anoxic condition. Baffles positioned within the selector zone permit control of microorganisms levels present in the zone. The wastewater introduced into the selector zone and treated via the microorganisms present therein, flows over a weir into the contact zone. In the contact zone, the solids suspended in the liquor (the mixture of the wastewater and activated sludge) settle to the bottom and pass through a line which returns it to the selector zone. The return line, however, includes a valve which controls the rate of passage. The treated wastewater (which includes waste activated sludge and treated water) passes from the contact zone into the clarifiers for final processing. The waste activated sludge that settles to the bottom of the clarifier tanks returns via a line to the stabilization zone, and then to the selector zone for further processing.

8 Claims, 1 Drawing Sheet

SELECTOR CONTACT STABILIZATION PROCESS AND APPARATUS FOR WASTEWATER TREATMENT

REFERENCE TO RELATED APPLICATION

The present application claims priority to U.S. Provisional Application Serial No. 60/178,917, filed Feb. 1, 2000.

BACKGROUND OF THE INVENTION

1. Field of Invention

The present invention is generally related to wastewater treatment processes and equipment, and more particularly to use of microorganisms in the treatment of wastewater.

2. Description of Prior Art

In a typical arrangement, municipal wastewater is treated by using aerobic organisms to consume the toxic materials present in the wastewater (for this reason the wastewater is commonly referred to as "food"), or at least break the materials down into forms which may be safely discharged. This type of process results in quite effective treatment of the wastewater. However, the aerobic organisms require oxygen to survive and are therefore suspended in tanks which are continuously aerated. This aspect of an otherwise effective process contains its drawbacks.

The constant aeration required to maintain an adequate level of organisms requires a constant supply of energy, and the more organisms needed to ingest the toxic materials, the more energy is needed for aeration. Consequently, the energy costs associated with running this type of aerobic process can become quite high.

Quite often, the organisms will perpetuate in a highly oxidized environment, thereby resulting in a growth in the number of organisms. Assuming the food level (e.g. amount of influent introduced into the system) remains relatively level, this growth in organisms results in a low food to microorganism ("F/M") ratio. A low F/M ratio results in a condition known as "bulking." Bulking is the point in the process where the organisms gain volume without increasing the processing of sludge.

When bulking occurs, a new breed of problems occur with the treatment process. For instance, the organisms begin to die and accumulate in the tanks. This build up results in odors being dissipated from the tank, and ultimately to the surrounding community. These organisms can also become airborne pathogens which are distributed in the treatment plant's vicinity, thereby creating illness. Furthermore, the tanks have to be scrubbed quite often to prevent or at least minimize the attendant problems, thereby resulting in processing downtime and, creating more expense for the facility.

3. Objects and Advantages

It is therefore a principal object and advantage of the present invention to provide a process and apparatus for treating sludge in an economical fashion.

It is an additional object and advantage of the present invention to provide a process and apparatus for more efficiently processing wastewater.

It is a further object and advantage of the present invention to provide a process and apparatus that may be retrofit into conventional contact stabilization systems.

It is another object and advantage of the present invention to provide a process and apparatus that enhances phosphorous and nitrogen removal from the wastewater.

It is another object and advantage of the present invention to provide a process and apparatus that decreases sludge production relative to the state of the art.

It is yet another object and advantage of the present invention to provide a process and apparatus to provide a treatment plant with additional five-day biochemical oxygen demand without requiring additional process tankage.

Other objects and advantages of the present invention will in part be obvious, and in part appear hereinafter.

SUMMARY OF THE INVENTION

In accordance with the foregoing objects and advantages, the present invention provides an apparatus and associated process for treating municipal wastewater. The apparatus of the present invention generally comprises a wastewater contact tank that is broken into three distinct zones: a selector zone positioned between a stabilization zone and a contact zone. The entire influent is introduced into the selector zone which is maintained in an anoxic condition. Baffles positioned within the selector zone permit control of microorganisms levels present in the zone.

The wastewater introduced into the selector zone and treated via the microorganisms present therein, flows over a weir into the contact zone. In the contact zone, the solids suspended in the liquor (the mixture of the wastewater and activated sludge) settle to the bottom and pass through a line which returns it to the selector zone. The return line, however, includes a valve which controls the rate of passage. The treated wastewater (which includes waste activated sludge and treated water) passes from the contact zone into the clarifiers for final processing.

The waste activated sludge that settles to the bottom of the clarifier tanks returns via a line to the stabilization zone. This waste activated sludge provides a good source of bacteria. The waste activated sludge flows over a weir into the selector zone for further processing.

Both the contact zone and stabilization zone are maintained in an oxidized condition, thereby permitting the microorganisms present therein to survive. By maintaining the selector zone in an anoxic condition, however, the aerobic organisms need to find sustenance elsewhere. Accordingly, the organisms ingest the nitrogen and phosphorous present in the wastewater for sustenance, thereby enhancing the purity of the effluent ultimately discharged from the facility.

The present apparatus permits the F/M ratio of the system to be maintained at a high level at all times, thereby alleviating the bulking problem resulting from low F/M ratios. By balancing the level of mixed liquor suspended solids re-introduced into the selector zone via the valve on the return line with the rate of influent introduced into the selector zone, a high F/M ratio can always be maintained. The valve could be manually controlled or controlled via a microprocessor programmed with the influent rates.

BRIEF DESCRIPTION OF THE DRAWING

The present invention will be better understood by reading the following Detailed Description in conjunction with the accompanying drawing, wherein.

DETAILED DESCRIPTION

Figure 1:
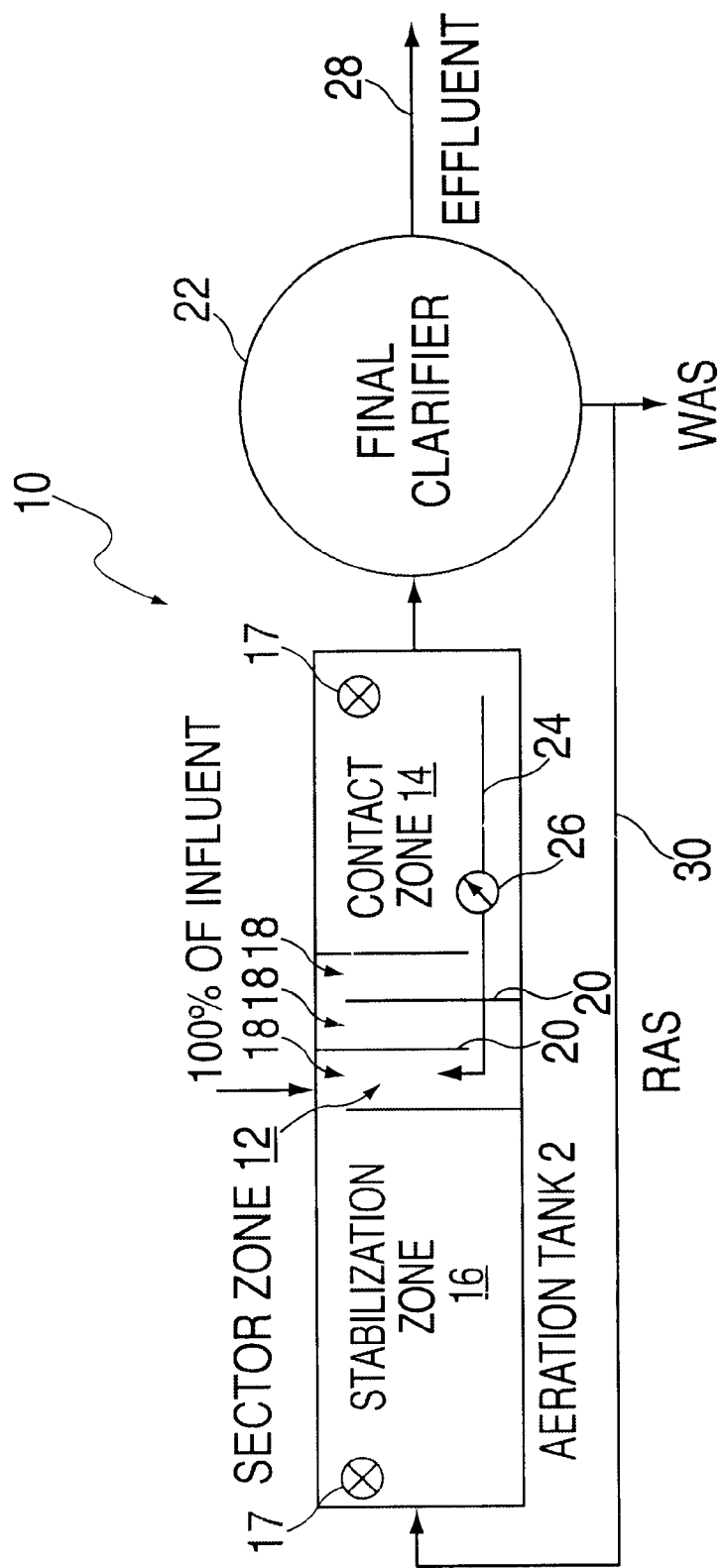
FIG. 1 is a schematic representation of the apparatus of the present invention.

Referring now to FIG. 1, the present invention is seen to comprise a contact tank, denoted generally by reference numeral 10, that is broken up into three distinct zones: a selector zone 12 positioned between a contact zone 14 and stabilization zone 16. Both the contact zone 14 and stabilization zone 16 are maintained in an oxic condition, via aeration blowers 17 or some other conventional form of aeration. Selector zone 12 is maintained in an anoxic condition.

The entire influent of wastewater is initially introduced directly into selector zone 12. Selector zone 12 is supplied with a constant source of aerobic microorganisms via recirculation from contact zone 14 and overflow from stabilization zone 16, as will be explained in greater detail hereinafter. As a result of the dissociation of the polyphospate bonded within phosphorous accumulating organisms, such as acinobactes, energy is provided under energy-starved anoxic conditions. Due to the anoxic state of selector zone 12, it "selects" high phosphorous accumulating organisms (i.e., organisms that ingest phosphorous, among other organic carbons, present in the influent wastewater) since they posses a higher energy advantage. These same organisms would subsequently uptake phosphorous in excess of basic metabolic requirements, and would be wasted by waste activated sludge, reducing effluent phosphorous.

Selector zone 12 is separated into compartments or stages 18 by baffles 20. By staging selector zone 12, the level of microorganisms present therein can be more accurately controlled. The influent is initially introduced into the compartment 18 positioned adjacent stabilization zone 16. The wastewater then passes over baffles 20, further treating the wastewater, until it flows over the weir and into contact zone 14.

The flow into contact zone 14 consists of wastewater and activated sludge (i.e., bacteria and decomposed water). This composition is referred to as "liquor" and a portion of it which does not contain any heavy solids flows from contact zone 14 into clarifiers 22 for further processing. The portion of the liquor which does contain solids, termed the "mixed liquor suspended solids" ("MLSS") settles to the bottom of contact zone 14. It then passes through line 24 and back to selector zone 12, and more particularly, the compartment 18 within selector zone 12 positioned adjacent stabilization zone 16.

A valve 26 positioned within line 24 permits selective control of the amount of MLSS passing through line 24 and into selector zone 12. The MLSS provides selector zone 12 with a source of bacteria for use in the initial process of the wastewater to maintain appropriate contact loading therein, thereby avoiding excessive chemical oxygen demand loading due to the industrial discharge. In order to control the population of microorganisms present in selector zone 12, and hence selectively control the F/M ratio present in selector zone 12, valve 26 can be controlled to release MLSS into selector zone 12 at a predetermined rate relative to the rate of influent (which is a known rate). Accordingly, sludge bulking can be avoided by maintaining a relatively high F/M ratio through the selective control of valve 26.

The portion of the liquor transported from zone 14 to clarifiers 22 is treated therein in the conventional clarifying manner which is well known in the art. The decomposed water processed in clarifiers 22 is discharged therefrom through effluent line 28. The portion of the waste activated sludge which settles to the bottom of clarifiers 22 is pumped back into stabilization zone 16 via lines 30.

The waste activated sludge returned into stabilization zone 16 flows from the bottom thereof to the top. Once it reaches the top, the waste activated sludge flows over a weir and into selector zone 12, and more particularly the compartment 18 within zone 12 that is adjacent stabilization zone 16, for further processing. The waste activated sludge is an additional source of microorganism for selector zone 12.

The apparatus of the present invention may be installed as a new construction in a waste water treatment plant, or may be retrofit into a conventional contact stabilization arrangement. In retrofitting a conventional contact stabilization arrangement, a multi-staged anoxic selector (i.e., selector zone 12) is installed at the inlet of the contact zone (i.e., contact zone 16). Internal recirculation pumping (i.e., line 24) capability is installed between the contact and selector in order to avoid excessive chemical oxygen demand loading in the selector's first stage (i.e., the compartment 18 adjacent stabilization zone 16), as a result of industrial discharge. As explained previously, excessive chemical oxygen demand loading are a cause of bulking, reducing oxygen transfer efficiency.

By retrofitting a conventional contact stabilization process in the manner described above, the introduction of an anoxic treatment stage has been found through testing to increase plant processing capacity by about 150% for small plants (plants having influent rates of 1–10 million gallons per day) to about 40% for large plants (plants having influent rates of 50–100 million gallons per day). In addition, testing has also found that for the same plant capacity, i.e., if a capacity expansion is not desired, the selector retrofit can be utilized to reduce sludge production and enhance nitrogen removal capacity by operating existing tankage at a larger solids residence time in an aeration tank. In addition, a selector retrofit would also significantly enhance excess biological phosphorous removal. However, phosphorous, would still need to chemically treated to comply with various regulations relative to acceptable phosphorous levels. The extent of phosphorous removal would increase with plant size since it is negatively impacted by nitrification as a result of nitrate recycle to the selector zone. As previously discussed, a larger degree of nitrification would be expected as plant size decreases, reducing phosphorous levels.

What is claimed is:

1. An aeration tank for receiving and treating wastewater, comprising:
   a. an anoxic selector zone into which said wastewater is introduced which includes first and second opposing sides;
   b. an contact zone positioned in fluid communication with said selector zone and adjacent said first side of said selector zone;
   c. a stabilization zone positioned in fluid communication with said selector zone and adjacent said second side of said selector zone; and
   d. a pipe including a selectively operable valve interconnected to said contact zone and said selector zone for providing settled solids from said contact zone to said selector zone.

2. The aeration tank according to claim 1, wherein said selector zone is divided into a plurality of compartments with baffles separating each of said compartments.

3. The aeration tank according to claim 1, further comprising a blower mounted within said stabilization zone.

4. The aeration tank according to claim 1, further comprising a blower mounted within said contact zone.

5. The aeration tank of claim 1, further comprising:
   a. a clarifying tank in fluid communication with said contact zone; and
   b. a second pipe interconnecting said clarifying tank and said stabilization zone for selectively recirculating activated sludge from said clarifying tank to said stabilization zone.

6. A method for treating wastewater in an aeration tank comprising a selector zone having a supply of aerobic microorganisms therein and first and second opposed sides, a contact zone positioned adjacent said first side, and a stabilization zone positioned adjacent said second side, said method comprising the steps of:

a. introducing said wastewater into said selector zone, thereby creating a liquor mixture comprising wastewater and activated sludge, a portion of which contains solids from said wastewater and a portion of which does not contain solids;

b. maintaining said selector zone in an anoxic condition;

c. maintaining said contact zone and said stabilization zone in an oxic condition;

d. permitting said liquor mixture to flow from said selector zone into said contact zone, wherein said portion containing solids settles to the bottom of said contact zone and is recirculated back into said selector zone, and said portion not containing solids is permitted to flow into a clarifying tank;

e. selectively controlling the rate at which said portion containing solids is recirculated from said contact zone to said selector zone;

f. recirculating a portion of said wastewater from said clarifying tank into the bottom of said stabilization zone; and g. permitting said wastewater recirculated into said stabilization zone to pass into said selector zone for further processing.

7. An aeration tank for receiving and treating wastewater, comprising:

a. an anoxic selector zone into which said wastewater is introduced which includes first and second opposing sides defined by first and second weirs;

b. an aerobic contact zone positioned adjacent to said first weir, wherein wastewater may flow from said selector zone over said first weir into said contact zone;

c. an aerobic stabilization zone positioned adjacent said second weir of said selector zone, wherein wastewater in said stabilization zone may flow from said stabilization zone over said weir into said selector zone;

d. a first pipe including a selectively operable valve interconnecting said contact zone and said selector zone for providing settled solids to said selector zone;

e. a clarifying tank in fluid communication with said contact zone; and f. a second pipe interconnecting said clarifying tank and said stabilization zone for selectively recirculating activated sludge from said clarifying tank to said stabilization zone.

8. The aeration tank of claim 7, wherein said selector zone is divided into a plurality of compartment with baffles separating each of said compartments.

* * * * *